US00RE33983E

United States Patent [19]

Hughes

[11] E Patent Number: Re. 33,983

[45] Reissued Date of Patent: Jul. 7, 1992

[54] ANIMAL DROSS ABSORBENT AND METHOD

[75] Inventor: John Hughes, Long Grove, Ill.

[73] Assignee: American Colloid Company, Arlington Heights, Ill.

[21] Appl. No.: 735,447

[22] Filed: Jul. 25, 1991

Related U.S. Patent Documents

Reissue of:

[64] Patent No.: 5,000,115
Issued: Mar. 19, 1991
Appl. No.: 297,471
Filed: Jan. 13, 1989

[51] Int. Cl.[5] ..... A01K 29/00
[52] U.S. Cl. ..... 119/173
[58] Field of Search ..... 119/171, 172, 173

[56] References Cited

U.S. PATENT DOCUMENTS

| | | | |
|---|---|---|---|
| 3,286,691 | 11/1966 | McFadden | 119/1 |
| 4,343,751 | 8/1982 | Kunar | 264/115 |
| 4,459,368 | 7/1984 | Jaffee et al. | 119/173 |
| 4,657,881 | 4/1987 | Crampton et al. | 502/80 |
| 4,685,420 | 8/1987 | Stuart | 119/1 |
| 4,844,010 | 7/1989 | Pucharue et al. | 119/1 |

FOREIGN PATENT DOCUMENTS

| | | | |
|---|---|---|---|
| 3620447A1 | 12/1987 | Fed. Rep. of Germany . | |
| 58-009626 | 1/1983 | Japan | 119/171 |
| 0094043 | 5/1985 | Japan | 119/173 |
| 63-219323A | 3/1987 | Japan . | |
| 3044823 | 2/1988 | Japan | 119/173 |
| 3185323 | 7/1988 | Japan | 119/173 |
| 1191626 | 8/1989 | Japan | 119/173 |

*Primary Examiner*—John G. Weiss
*Attorney, Agent, or Firm*—Marshall, O'Toole, Gerstein, Murray & Bicknell

[57] ABSTRACT

A composition and method of absorbing animal dross. Discrete particles of a composition comprising a water-swellable bentonite clay absorb animal dross and related liquids, and simultaneously agglomerate into a sufficiently large and stable mass therefore permitting physical separation and removal of the wetted mass of particles from unwetted particles of the composition. Removing the wetted and agglomerated composition particles from the remaining unwetted composition reduces or eliminates offensive odors produced by dross-soaked particles.

24 Claims, 1 Drawing Sheet

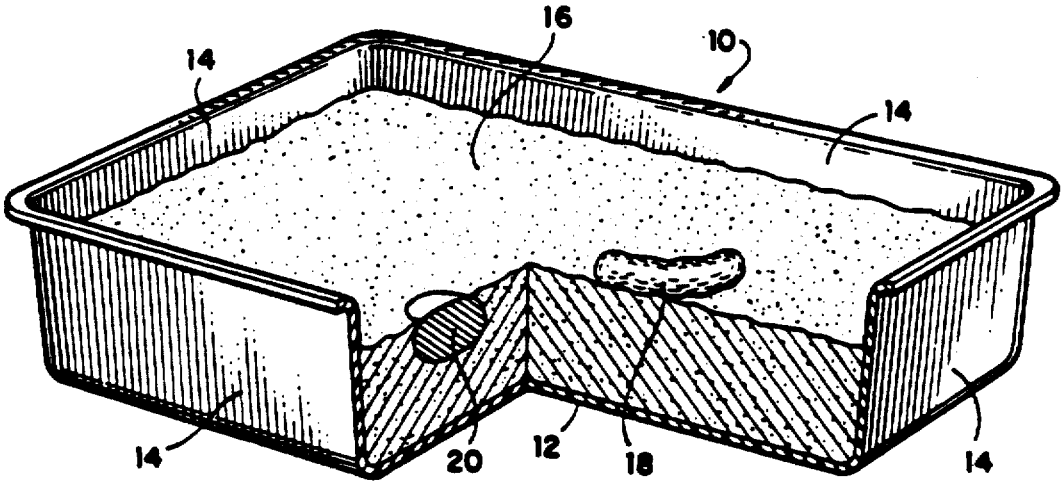
16
10
14
14
14
20
12
18
14

ANIMAL DROSS ABSORBENT AND METHOD

Matter enclosed in heavy brackets [ ] appears in the original patent but forms no part of this reissue specification; matter printed in italics indicates the additions made by reissue.

FIELD OF THE INVENTION

The present invention relates to an absorbent composition for animal dross and its method of use. More particularly, the present invention relates to a composition comprising a water-swellable bentonite clay, such as sodium bentonite or calcium bentonite. Discrete particles of the water-swellable bentonite clay effectively absorb animal dross and simultaneously agglomerate into a sufficiently large and stable mass, such that the wetted mass of absorbent composition can be separated from unwetted particles of the composition and removed from a litter box. Consequently, odors emanating from the litter box are reduced or eliminated, and cost savings are achieved because the contents of the litter box, including both the soiled and the unsoiled absorbent composition, do not have to be discarded on a periodic basis.

BACKGROUND OF THE INVENTION AND PRIOR ART

House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added absorbent materials to the litter box or cage to collect the urine and feces. After a relatively short period of time, the dross-soiled absorbent emits objectionable odors because of the presence of the urine and fecal matter.

In order to reduce or eliminate these objectionable odors, homeowners periodically remove the fecal matter from the litter absorbent physically. However, physical removal of the feces does not reduce or eliminate odors caused by the urine absorbed into the absorbent. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that an individual cleaning of the litter box is not particularly economically burdensome. However, repeated litter box cleanings over a period of time accounts for relatively large expenditures.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost, but each suffers from the disadvantage of merely absorbing a liquid waste product and holding the product within its porous matrices, or, in the case of sand, adsorbing the liquid dross on its surface. For each absorbent material, offensive odors are eventually caused by the absorbed urine, and the entire contents of the litter box, including soiled absorbent material and unsoiled absorbent material, has to be discarded.

One such litter box absorbent material is described in Lohman U.S. Pat. No. 4,570,573. The Lohman patent is directed to an animal litter composition comprising about 60–94% by weight paper, about 1–35% calcium sulfate and about 3–12% water. Such an absorbent is effective in collecting animal dross, but it does not reduce or eliminate the generation of objectionable odors and does not eliminate the disadvantage of periodically replacing the entire contents of the litter box. Larson et al in U.S. Pat. No. 4,315,761 describes the use of aerated or foaming concrete, of relatively large size, like up to 10 mm (millimeters), to absorb animal dross and facilitate removal of the excrement from a litter box. The aerated concrete merely absorbs the animal dross, and therefore suffers from the identical drawback of present day animal litter box compounds, i.e., an inability to easily separate the soiled absorbent particles from the unsoiled absorbent particles without having to clear and clean the entire litter box.

Stuart, in U.S. Pat. No. 4,685,420, disclosed an improved litter box absorbent composition comprising from 0.01% to 5.0% by weight of a water-absorbing polyacrylate in combination with a common litter box absorbent material. According to the method and composition of Stuart, the polyacrylate and absorbent material absorb the urine or similar waste material, and the polyacrylates act to gel the soiled litter box absorbent material into a gelled product. Stuart teaches that the gelled absorbent material then can be physically removed from the litter box to reduce the generation of offensive odors, and to avoid discarding the unsoiled portion of the absorbent material. However, the method and composition of Stuart suffers from the disadvantage of relative cost ineffectiveness. The commonly used litter box absorbent materials are very inexpensive materials, whereas the water-absorbent polymers of Stuart are relatively expensive products that can raise the initial cost of the litter box absorbent material to an unacceptable level in a very cost competitive market.

Other litter box absorbent materials are disclosed by Fisher in U.S. Pat. No. 3,765,371 describing a foamed plastic for absorbing and/or adsorbing animal dross; by Kramer et al in U.S. Pat. Nos. 4,275,684 and 4,395,357 describing calcium silicate as an animal litter box absorbent material and specifically teaching against the use of mineral products, such as clay-type minerals, because of the mineral product's tendency to swell upon liquid absorption; by Rodriguez et al in U.S. Pat. No. 4,494,481 describing the addition of a [transmition] *transition* metal of Group Ib or IIb of the periodic table to present-day litter box absorbent materials to prevent the development of urine odors; and by Greenberg in U.S. Pat. No. 4,638,763 describing the addition of sodium sulfate to a litter box absorbent material to facilitate removal of soiled absorbent from the litter box.

Therefore, a need exists for a litter box absorbent material that effectively collects the urine or other dross material of house-broken pets and caged animals; that agglomerates when wetted to allow physical removal of the wetted litter box absorbent material from unwetted litter box absorbent material in order to reduce or eliminate dross-based odors and to reduce costs associated with animal litter box absorbent materials; and that is sufficiently economical for practical use in a highly competitive and cost conscious market. Surprisingly and unexpectedly, it has been found that water-swellable bentonite clays effectively absorb animal dross; and during absorption of the animal dross, agglomerate into a sufficiently large and stable mass for physical separation of the soiled portion of the litter box absorbent material from the unused portion of the litter box absorbent material. The water-swellable bentonite clays, and their absorbent and agglomerating properties, effectively reduce or eliminate odors associated with animal dross; reduce costs associated with litter box absorbent material replacement; and are sufficiently economical to compete effectively in a highly competitive and cost conscious industry.

SUMMARY OF THE INVENTION

In brief, the present invention is directed to a composition and method of absorbing animal dross. The composition comprises discrete particles of a water-swellable bentonite clay that effectively absorbs animal dross and simultaneously agglomerates into a sufficiently large and stable mass, thereby permitting physical separation of the soiled and wetted water-swellable bentonite clay particles from discrete particles of the unsoiled and unwetted water-swellable bentonite clay.

Therefore, it is an object of the present invention to provide an improved absorbent composition for animal waste products and related waste products.

Another object of the present invention is to provide a composition that effectively absorbs animal dross and simultaneously agglomerates into a mass of sufficient size and cohesive strength for physical removal from unwetted litter box absorbent composition.

Another object of the present invention is to provide a composition that eliminates or reduces odors associated with animal dross deposited in a litter box.

Another object of the present invention is to provide a composition that economically eliminates or reduces odors associated with animal dross deposited in a litter box.

Another object of the present invention is to provide a composition that facilitates and reduces cleaning and maintenance of animal litter boxes and animal cages.

Still another object of the present invention is to provide a composition that overcomes the disadvantages of prior art animal litter box absorbent compositions and that is economically competitive with prior art litter box absorbents.

Another object of the present invention is to provide a composition for absorbing animal dross such that the physical removal of urine from an animal litter box is possible.

Another object of the present invention is to provide a method of effectively absorbing animal dross with a composition comprising a water-swellable bentonite clay that simultaneously agglomerates the into a sufficiently large mass of sufficient strength upon absorbing the animal dross to permit physical separation of soiled and wetted bentonite clay particles from the unsoiled and unwetted bentonite clay particles.

The above and other objects and advantages of the present invention will become apparent from the following detailed description of the invention.

BRIEF DESCRIPTION OF THE DRAWING

FIG. 1 is a perspective view of a receptacle including the absorbent composition of the present invention.

DETAILED DESCRIPTION OF THE INVENTION

In accordance with the method and composition of the present invention, water-swellable bentonite clays have been found useful as animal dross absorbents. The water-swellable bentonite clays of the present invention provide advantages over prior art animal litter box absorbent compositions in that the water-swellable bentonite clays are capable of absorbing several times their weight in liquid dross material and also are capable of simultaneously agglomerating to form a wetted mass of sufficient size and cohesive strength such that the soiled and wetted mass can be physically separated from the remaining unwetted water-swellable bentonite clay absorbent. These properties of the water-swellable bentonite clays serve to reduce or eliminate odors resulting from urine-saturated litter box absorbents; to reduce the cost of using a litter box absorbent material because only soiled absorbent material is discarded; and to reduce the number of times the litter box or animal cage must be completely cleaned. Furthermore, the water-swellable bentonite clays of the present invention provide these cost saving and work saving benefits without adding expensive supplementary compounds, such as water-absorbent polymers, that can prohibitively increase the cost of a product competing in a very cost-conscious market.

In accordance with an important feature of the present invention, the water-swellable bentonite clays provide an improved animal litter box absorbent composition. The water-swellable bentonite clays of the present invention absorb several times their own weight of an aqueous fluid, such as urine, and consequently swell. The wetted, swelled bentonite particle then interacts with nearby wetted and swelled bentonite particles and agglomerates through physical and chemical interactions, such as hydrogen bonding and entanglement, to form a wetted mass of sufficient stability and size such that the mass can be removed from the unwetted particles of the water-swellable bentonite clay. The chemical and physical interactions that cause the wetted bentonite clay particles to agglomerate are not present when the bentonite clay particles are dry, hence separation of the wetted, swelled bentonite clay particles from the unwetted and unswelled bentonite clay particles is facilitated.

In practice, when an animal urinates on the litter box absorbent of the present invention, the urine is absorbed by the water-swellable bentonite to form an agglomerated mass of water-swellable bentonite and urine. This agglomerated mass has sufficient physical integrity to be removed from a litter box, or an animal cage, by using the implements and methods normally used to remove feces from a litter box. Therefore, the litter box absorbent composition of the present invention permits the animal owner or caretaker to employ the same removal techniques used to remove feces from the litter box to remove urine from the litter box. Before the method and composition of the present invention, it was not possible to mechanically remove urine from a litter box utilizing only a clay as the absorbent because the urine-soaked particles could not be differentiated from the unsoiled absorbent in the litter box.

In accordance with an important feature of the present invention, the water-swellable bentonite clay absorbent remaining in the litter box after removal of the urine-soaked and agglomerated bentonite clay still is available for future use. This portion of the litter box absorbent composition is still clean and useful, and does not contribute to the generation of noxious odors. In contrast, when using prior art litter box absorbents, such clean and useful absorbent material had to be discarded with the soiled absorbent material because no means existed to effectively separate the soiled absorbent from the fresh absorbent.

For example, FIG. 1 shows a litter box 10 comprising a water-impermeable floor member 12 having integral, water-impermeable upstanding walls 14. The unsoiled absorbent composition 16, comprising a water-swellable bentonite clay, is placed in the litter box 10. Solid animal dross 18, such as fecal matter, is of sufficient mass and of sufficient cohesive strength to be physically removed from the litter box for ultimate disposal. Liquid animal dross, such as urine, vomit or blood, contacts the absorbent, water-swellable bentonite composition 16, causing the water-swellable bentonite to agglomerate into a soiled solid mass 20 of sufficient size and sufficient cohesive strength to allow physical removal of the soiled solid mass 20 from the remaining unsoiled absorbent composition 16. The remaining unsoiled absorbent composition 16 does not contribute to the generation of noxious odors and can remain in litter box 10 for future use. Soiled solid mass 20 is discarded in an appropriate manner without the need of cleaning the entire litter box 10 and discarding its entire contents.

Therefore, and in accordance with another important feature of the present invention, the water-swellable bentonite clays provide a cost savings over the prior art litter box absorbents. First, cost savings are realized because unsoiled and unused absorbent composition is not discarded with the soiled absorbent composition. Secondly, and most surprisingly and unexpectedly, the water-swellable bentonite clays provide these cost-saving benefits without the addition of expensive polymeric compounds that force the absorbent particles to gel into a removable physical mass. Therefore, utilizing the water-swellable bentonite clays of the present invention minimizes the raw material cost of the litter box absorbent composition in a cost competitive market.

The litter box absorbent composition of the present invention comprises a water-swellable bentonite clay. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The water-swellable bentonite clays useful in the animal dross absorbent compositions of the present invention include any water-swellable bentonite clay that hydrate in the presence of water, e.g., swell in the presence of water. The water-soluble bentonite clay can be selected from the group consisting of sodium bentonite, potassium bentonite, lithium bentonite, calcium bentonite and magnesium bentonite; or [combination] *combinations* thereof. The bentonite clay can be any member of the dioctahedral or trioctahedral smectite group, or a mixture thereof. Examples include Montmorillonite, Beidellite, Nontronite, Hectorite and Saponite; or combinations thereof. [The bentonite clay of the present invention also can be Attapulgite or Sepiolite.]

In order to achieve the full advantage of the present invention, regardless of the water-swellable bentonite that is used in the litter box absorbent composition, it is preferred that the bentonite clay is not calcined. Calcination results a loss of a portion of the hydroxyl groups from the bentonite clay, and such hydroxyl groups are related to the water-absorption and water-swelling properties of the bentonite clay. Consequently, a calcined bentonite clay, while still able to absorb many times its weight of a liquid, may not swell and agglomerate with nearby wetted and calcined bentonite particles as effectively as uncalcined bentonite particles.

In accordance with another important feature of the present invention, a water-swellable bentonite clay useful in a litter box absorbent composition is present in a particle size ranging from about 50 u (microns) to about 3350 $\mu$ in diameter, and more preferably in a particle size ranging from about 600 $\mu$ to about 3350 $\mu$ in diameter; or, in other words, in a particle size of from about a 6 mesh to about 100 mesh. It has been found that water-swellable bentonite particles appreciably greater than about 3350 $\mu$ in diameter do not sufficiently cohesively agglomerate to allow facile physical separation of the wetted, agglomerated mass from the litter box. Furthermore, it has been found that water-swellable bentonite particles appreciably smaller than about 50 $\mu$ in diameter produce a litter box absorbent composition that is too dusty. However, in order to achieve the full advantage of the present invention, the water-swellable bentonite clay should be present in the composition in particle sizes across the entire range of about 600 $\mu$ to about 3350 $\mu$ because the smaller diameter water-swellable bentonite particles, upon being wetted, swell and serve as "bridges" between larger, wetted bentonite particles. The overall effect is the production of a sufficiently large wetted mass with excellent physical cohesive strength.

The litter box absorbent composition of the present invention can consist only of a water-swellable bentonite clay, thereby avoiding any extra compounding process steps. In addition, the litter box absorbent composition of the present invention optionally can include perfumes, deodorants, odor absorbents, antimicrobial agents, disinfectants, colorants and pesticides, in an amount sufficient for perform their intended function. The litter box absorbent composition also can include other typically used litter box absorbents such as other clays, sand, or cellulose-based materials. However, any optionally added ingredient cannot be present in an amount that materially and adversely affects the ability of the water-swellable bentonite clay to absorb liquid dross products and simultaneously agglomerate into a monolithic mass of sufficient size and cohesive strength for physical removal of the soiled and wetted mass from the litter box. Any optional ingredients and additional absorbents are dry-blended into the water-swellable bentonite clay of the present invention and the water-swellable clay is present in an amount of at least 65% by weight of the composition, and to achieve the full advantage of the present invention the water-swellable clay is present in an amount of at least 90% by weight of the composition.

It should be noted that the animal dross absorbent of the present invention can be used in litter boxes or in cages of animals including, among others, household pets such as cats, dogs, gerbils, guinea pigs, mice and hamsters; other pets such as rabbits, ferrets and skunks; or laboratory animals such as monkeys, mice, rats, goats, horses, cows and sheep. The animal litter absorbent of the present invention is especially useful for smaller animals, such as cats. Furthermore, the water-swellable bentonite clay of the present invention is suitable for other uses in addition to absorbing urine, such as absorbing vomit or absorbing waste liquids in appropriate areas of slaughter houses and meat packing plants.

To demonstrate the new and unexpected results of the present invention, 454 g. (one pound) of a water-swellable bentonite of the present invention was placed in a plastic litter box. The litter box then was used in a house that included 2 cats as household pets. The cats urinated in the litter box at regular intervals, causing the water-swellable bentonite of the present invention to agglomerate into sufficiently large and stable masses for at least daily physical removal, depending upon the quantity of urine and feces deposited in the litter box. The unsoiled water-swellable bentonite was allowed to remain in the litter box for subsequent use, and it was found that the litter box was free of offending odors for 14 days. After this time, the litter box was recharged with more of the water-swellable bentonite of the present invention. At the user's option, the litter box could be completely cleaned, or an additional amount of the water-swellable bentonite clay could be added to the small amount of remaining, unsoiled bentonite clay without cleaning the litter box because no offensive odors were being generated. In contrast, present day animal litter absorbents generate a sufficient amount of offensive odors such that the litter box must be cleaned at least weekly, and usually at least twice weekly.

Obviously, many modifications and variations of the invention as hereinbefore set forth can be made without departing from the spirit and scope thereof and therefore only such limitations should be imposed as are indicated by the appended claims.

What is claimed and sought to be secured by Letters Patent is:

1. A litter box comprising a water-impermeable receptacle having disposed therein an absorbent composition capable of agglomerating upon wetting into a mass of sufficient size and of sufficient cohesive strength for physical removal of the agglomerated mass from a litter box, said absorbent composition comprising particles of a water-swellable bentonite clay having a particle size ranging from about 50 microns to about 3350 microns, and having a sufficient amount of fine particles such that upon wetting, a substantial quantity of the clay will agglomerate.

[2. The litter box of claim 1 wherein the water-swellable bentonite clay is selected from the group consisting of Montmorillonite, Beidellite, Nontronite, Hectorite, Saponite, Attapulgite and Sepiolite; or combinations thereof.]

3. The litter box of claim 1 wherein the water-swellable bentonite clay is non-calcined water-swellable bentonite clay.

4. The litter box of claim 1 wherein the water-swellable bentonite clay fines have a particle size ranging from about 50 microns to about 600 microns.

5. The litter box of claim 1 wherein the absorbent composition comprises at least 90% by weight of the water-swellable bentonite clay.

6. The litter box of claim 1 wherein the absorbent composition comprises at least 65% by weight of the water-swellable bentonite clay.

7. The litter box of claim 1 wherein the absorbent composition further comprises sand, wood chips, wood shavings, shredded paper, a perfume, a deodorant, an odor absorbent, an antimicrobial agent, a disinfectant, a colorant or a pesticide; or combinations thereof.

8. A litter box absorbent composition consisting essentially of particles of a water-swellable bentonite clay capable of agglomerating upon wetting into a mass of sufficient size and cohesive strength for physical removal of the agglomerated mass from a litter box wherein the clay has a particle size ranging from about 50 microns to about 3350 microns, and includes a sufficient amount of fine particles such that upon wetting, a substantial quantity of the clay will agglomerate.

9. A litter box absorbent composition of claim 8 wherein the water-swellable bentonite clay is non-calcined water-swellable bentonite clay.

10. The litter box absorbent composition of claim 8 wherein the water-swellable bentonite clay fines have a particle size ranging from about 50 microns to about 600 microns.

11. A litter box absorbent composition having essentially no water-swellable organic polymeric material comprising particles of a water-swellable bentonite clay capable of agglomerating upon wetting into a mass of sufficient size and cohesive strength for physical removal of the agglomerated mass from a litter box wherein the bentonite clay has a particle size ranging from about 50 microns to about 3350 microns, and includes a sufficient amount of fine particles such that upon wetting, a substantial quantity of the clay will agglomerate.

12. A method of agglomerating liquid animal dross to facilitate removal of the liquid animal dross from a litter box comprising contacting an absorbent composition in the litter box with the liquid animal dross, wherein the absorbent composition comprises particles of a water-swellable bentonite clay having a particle size ranging from about 50 microns to about 3350 microns, and having a sufficient amount of fine particles such that upon wetting, a substantial quantity of the clay will agglomerate.

13. A method of selectively removing liquid animal dross from a litter box comprising:

adding to a litter box an absorbent composition comprising particles of a water-absorbent bentonite clay having a particle size ranging from about 50 microns to about 3350 microns, and having a sufficient amount of fine particles such that upon wetting, a substantial quantity of the clay will agglomerate;

contacting the water-absorbent bentonite clay in the litter box with the liquid animal dross thereby producing an agglomerated mass comprising the absorbent composition and the liquid animal dross that is of sufficient size and of sufficient cohesive strength to be removed from the litter box; and removing the agglomerated mass from the litter box thereby removing the liquid animal dross from the litter box.

14. The method of claim 13 wherein the liquid animal dross includes urine, vomit or blood; or combinations thereof.

15. A method of agglomerating liquid animal dross to facilitate removal of the liquid animal dross comprising contacting the liquid animal dross with an absorbent material consisting essentially of a water-swellable bentonite clay having a particle size ranging from about 50 microns to about 3350 microns, and having a sufficient amount of fine particles such that upon wetting, a substantial quantity of the clay will agglomerate.

16. A method of cleaning an animal litter box and reducing litter box odors comprising:

adding to a litter box an absorbent composition comprising a water-swellable bentonite clay that is capable of agglomerating upon contact with a liquid animal dross to form an agglomerated mass of sufficient size and of sufficient cohesive strength to allow physical removal of the agglomerated mass from the litter box, said clay having a particle size ranging from about 50 microns to about 3350 microns, and having a sufficient amount of fine particles such that upon wetting, a substantial quantity of the clay will agglomerate;

contacting the absorbent composition with the liquid animal dross to form the agglomerated mass of the absorbent composition; and removing essentially only the agglomerated mass from the litter box.

17. A receptacle for receiving animal dross comprising a water-impermeable floor member having integral, water-impermeable upstanding wall means for retention of an absorbent composition above the floor member, wherein the composition comprises particles of a water-swellable bentonite clay capable of agglomerating upon wetting into a mass of sufficient size and of sufficient cohesive strength for physical removal of the mass from the receptacle, said clay having a particle size ranging from about 50 microns to about 3350 microns, and having a sufficient amount of fine particles such that upon wetting, a substantial quantity of the clay will agglomerate.

18. A litter box comprising a water-impermeable receptacle having disposed therein an absorbent composition capable of agglomerating upon wetting into a mass of sufficient size and of sufficient cohesive strength for physical removal of the agglomerated mass from a litter box, said absorbent composition comprising particles of a water-swellable bentonite clay having a particle size over essentially the entire range of from about 600 microns to about 3350 microns.

[19. The litter box of claim 18 wherein the water-swellable bentonite clay is selected from the group consisting of Montmorillonite, Beidellite, Nontronite, Hectorite, Saponite, Attapulgite and Sepiolite; or combinations thereof.]

20. The litter box of claim 18 wherein the water-swellable bentonite clay is a non-calcined water-swellable bentonite clay.

21. A litter box absorbent composition consisting essentially of particles of a water-swellable bentonite clay capable of agglomerating upon wetting into a mass of sufficient size and cohesive strength for physical removal of the agglomerated mass from a litter box wherein the clay has a particle size over essentially the entire range from about 600 microns to about 3350 microns.

[22. The litter box of claim 21 wherein the water-swellable bentonite clay is selected from the group consisting of Montmorillonite, Beidellite, Nontronite, Hectorite, Saponite, Attapulgite and Sepiolite; or combinations thereof.]

23. The litter box of claim 21 wherein the water-swellable bentonite clay is a non-calcined water-swellable bentonite clay.

24. A litter box absorbent composition having essentially no water-swellable organic polymeric material comprising particles of a water-swellable bentonite clay capable of agglomerating upon wetting into a mass of sufficient size and cohesive strength for physical removal of the agglomerated mass from a litter box wherein the bentonite clay has a particle size over essentially the full range from about 600 microns to about 3350 microns such that upon wetting and partial drying, a substantial quantity of the clay is agglomerated and the agglomerated clay has sufficient strength for physical removal from a litter box as an agglomerated mass.

25. A method of agglomerating liquid animal dross to facilitate removal of the liquid animal dross from a litter box comprising contacting an absorbent composition in the litter box with the liquid animal dross, wherein the absorbent composition comprises particles of a water-swellable bentonite clay having a particle size over essentially the full range from about 600 microns to about 3350 microns, such that upon wetting, a substantial quantity of the clay will agglomerate.

26. A method of selectively removing liquid animal dross from a litter box comprising:

adding to a litter box an absorbent composition comprising particles of a water-absorbent bentonite clay having a particle size over essentially the full range from about 600 microns to about 3350 microns, contacting the water-absorbent bentonite clay in the litter box with the liquid animal dross thereby producing an agglomerated mass comprising the absorbent composition and the liquid animal dross that is of sufficient size and of sufficient cohesive strength to be removed from the litter box; and removing the agglomerated mass from the litter box thereby removing the liquid animal dross from the litter box.

27. A method of cleaning an animal litter box and reducing litter box odors comprising:

adding to a litter box an absorbent composition comprising a water-swellable bentonite clay that is capable of agglomerating upon contact with a liquid animal dross to form an agglomerated mass of sufficient size and of sufficient cohesive strength to allow physical removal of the agglomerated mass from the litter box, said clay having a particle size over essentially the entire range from about 600 microns to about 3350 microns, contacting the absorbent composition with the liquid animal dross to form the agglomerated mass of the absorbent composition; and removing essentially only the agglomerated mass from the litter box.

* * * * *